March 27, 1951
C. E. BRANICK
2,546,849
ROTATABLY AND PIVOTALLY ADJUSTABLE
WHEEL HOIST AND SUPPORT
Filed May 27, 1946
2 Sheets-Sheet 2
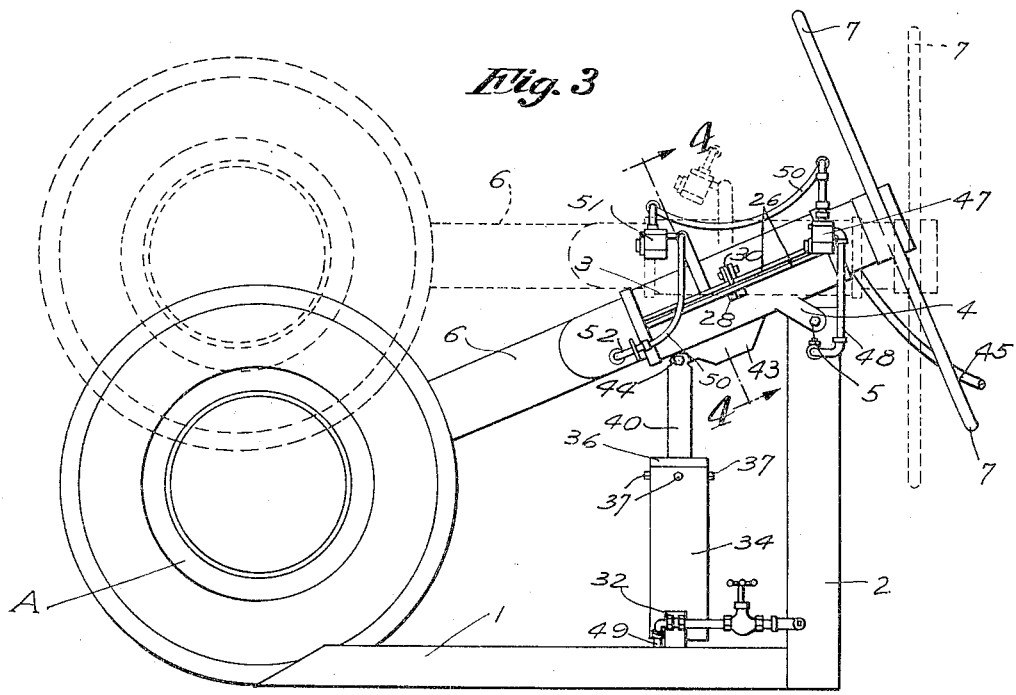
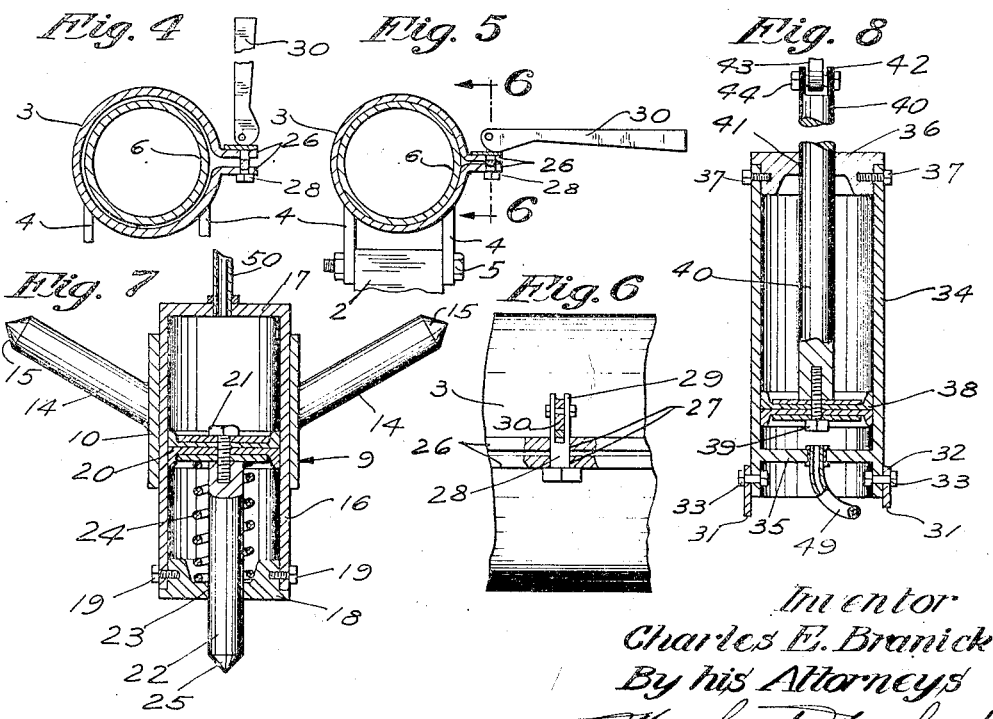
Inventor
Charles E. Branick
By his Attorneys
Merchant & Merchant Patented Mar. 27, 1951

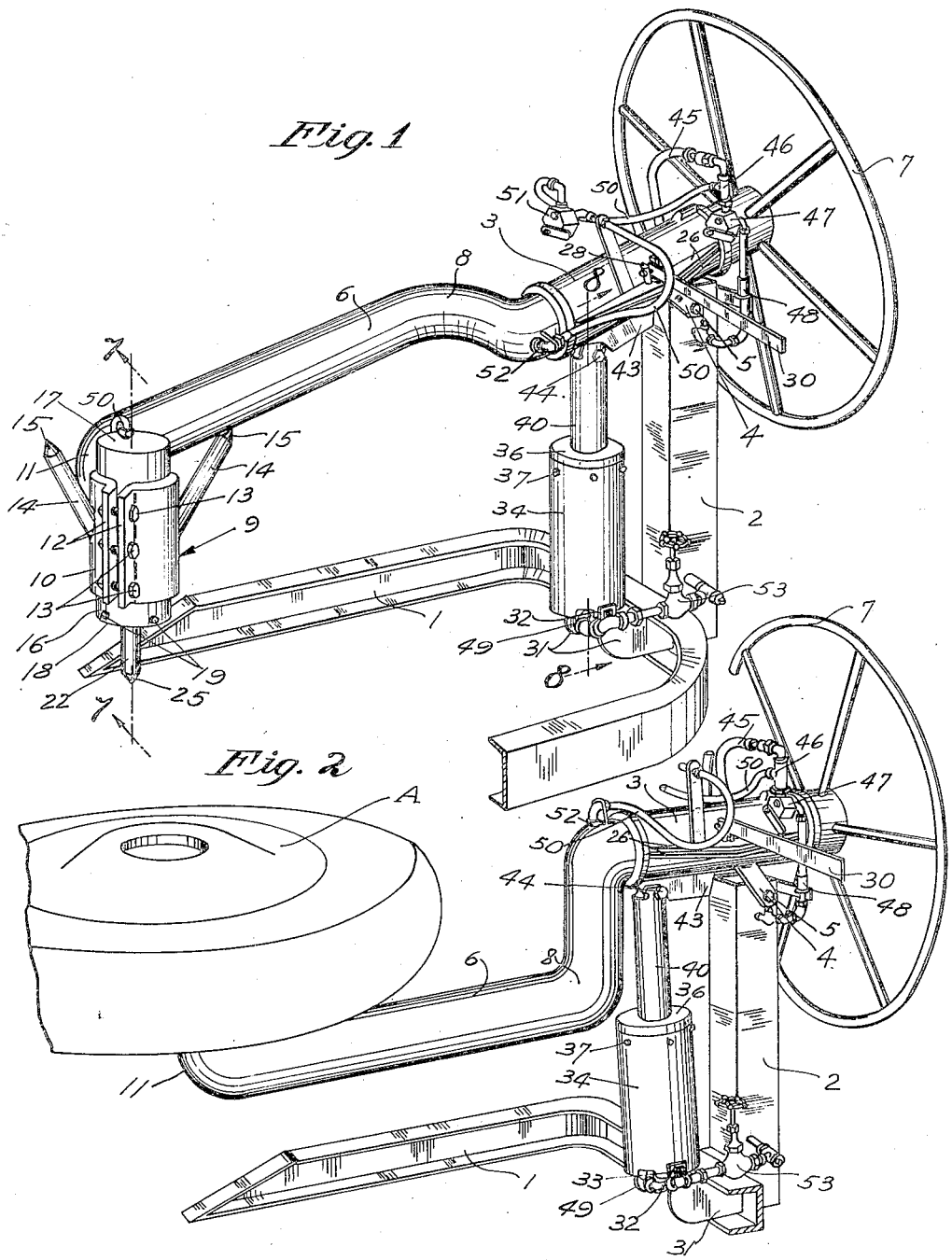

2,546,849

UNITED STATES PATENT OFFICE 2,546,849

ROTATABLY AND PIVOTALLY ADJUSTABLE WHEEL HOIST AND SUPPORT

Charles E. Branick, Fargo, N. Dak.

Application May 27, 1946, Serial No. 672,502

1 Claim. (Cl. 144—288)

My invention relates to a device for facilitating the application and removal of pneumatic tires from their rims and is in the nature of an improvement upon the structure disclosed and broadly claimed in my co-pending application for U. S. Letters Patent, Serial No. 595,782, now Patent No. 2,448,414.

The objects and advantages of my invention will become apparent from the following detailed specification, appended claim and attached drawings.

Referring to the drawings, wherein like characters indicate like parts throughout the several views:

Fig. 1 is a side perspective, some parts being broken away;

Fig. 2 is a view corresponding generally to Fig. 1, showing some of the parts in different positions with a tire-equipped rim mounted thereon, some parts being broken away;

Fig. 3 is a side elevational view, one position thereof being shown by dotted lines;

Fig. 4 is a transverse cross sectional view taken on the line 4—4 of Fig. 3;

Fig. 5 is a view corresponding to Fig. 4, but showing a different position of the parts;

Fig. 6 is a fragmentary detail taken on the line 6—6 of Fig. 5, and is partly in section and partly in side elevation;

Fig. 7 is a fragmentary detail in cross-section taken on the line 7—7 of Fig. 1; and Fig. 8 is a view in cross-section taken on the line 8—8 of Fig. 1, with some parts broken away.

Referring with greater particularity to the drawings, the numeral 1 indicates a base, preferably and as shown, being U-shaped in form and constructed of channel or other structural iron. Rigidly secured to the closed end of base 1, intermediate the sides thereof, is a box-like upright supporting member 2. An elongated split sleeve 3 is provided with a pair of laterally-spaced depending hinge lugs 4, which are pivoted to the opposite sides of supporting member 2 adjacent the top thereof by means of a hinge pin in the form of a bolt 5 (see Fig. 5). An elongated forwardly-projecting arm 6, preferably and as shown, being tubular in form, is journalled for rotation, adjacent its rear end, in the split sleeve 3. Secured to the extreme rear end of arm 6 is a hand wheel or other suitable turning means 7. Tubular arm 6 is laterally offset at 8 so as to position the tire rim engaging mechanism, mounted on its outer end, and identified in its entirety by the numeral 9, in approximate alignment with the axis of rotation of the tubular arm 6 in the sleeve 3.

The tire rim engaging mechanism 9 is substantially identical to that tire rim engaging mechanism disclosed in my above-identified co-pending application, and is in the nature of an expanding mandrel rigidly retained within a split collar 10, which in turn is welded or otherwise secured to the inturned end 11 of tubular arm 6. Collar 10 is provided with a pair of out-turned parallel flanges 12 which are equipped with tightening bolts 13. Secured to and diverging from collar 10, in substantially the same plane, is a pair of fixed dogs 14 having rim engaging tips 15 at their extreme outer ends. Rigidly retained within collar 10 is a cylinder 16 (see particularly Fig. 7) having a closed end 17 and having a bearing cap 18 which is removably secured thereto by screws 19. Mounted for reciprocation within the cylinder is a suitable piston 20 which is equipped by means of an axially-extending bolt 21, with an elongated movable dog 22, which works through an opening 23 in bearing cap 18. Piston 20 is biased toward the closed end 17 by means of a coil compression spring 24 surrounding the dog 22 within the cylinder 16. Removable dog 22 is provided with a rim engaging tip 25.

Elongated split sleeve 3 is provided at one side thereof with a pair of radially-projecting normally-spaced parallel flanges 26, through aligned apertures 27 in which a headed bolt 28 is loosely mounted. The outer end of bolt 28 is bifurcated at 29 to receive the inner end of a cam rod 30. In Fig. 4 the cam rod is in a position to allow rotation of the tubular arm 6 in the sleeve 3; while in Fig. 5 the cam rod 30 is shown in a position to lock the arm 6 against rotation.

Projecting forwardly from the intermediate portion of the closed end of base 1 is a pair of laterally-spaced supporting brackets 31 having upturned ends 32 (see particularly Fig. 8). Pivotally mounted between the upstanding ends 32 of brackets 31, by means of bolts 33, is a cylinder 34, which has a closed bottom 35 and a bearing cap 36 removably secured thereto by means of bolts 37. Mounted for reciprocation within the cylinder 34 is a piston 38 which, by means of an axially-extending bolt 39, carries a push rod 40, which extends through an opening 41 in bearing cap 36. The extreme upper end of the push rod 40 is bifurcated as indicated at 42 to loosely receive a depending lug 43. A pivot pin 44 extends through the bifurcated end 42 of push rod 40 and through the depending lug 43 so as to permit pivotal movements of one with respect to the other.

A source of fluid pressure, not shown, is connected to an inlet pipe 45. Inlet pipe 45 is connected to a T 46 which in turn is connected to a three-way valve 47 of a type disclosed and claimed in my Patent No. 2,310,892. A conduit 48 extends downwardly, preferably and as shown, by way of the interior of box-like supporting member 2, and communicates at 49 with the bottom end of cylinder 34.

Leading from the T 46 is another air tube or conduit 50 which is connected to a still further three-way valve 51 similar in all respects to valve 47, and then extends to, and communicates with the closed end 17 of cylinder 16. Preferably, and as shown, conduit 50 enters tubular arm 6 at 52 and is concealed within the same until just prior to its connection with the closed end 17 of the cylinder 16.

Operation

It should be obvious that when the three-way valve 51 is manually placed in a position to allow air or other fluid under pressure to enter the cylinder 16, that the piston 20 will be forced outward against the action of spring 24 to a point where it will contact the rim of a wheel assembly, as indicated by A, with sufficient force to impose equal pressure by all three dogs, 14 and 22, against said rim. This force is sufficient not only to center the rim with respect to the tire rim engaging mechanism 9, but also to permit lifting of any given rim, and turning of the same to any desired position.

To elevate the rim to the desired height, it is only necessary to position valve 47 so that air under pressure will enter the bottom of cylinder 34, thus forcing piston 38, push rod 40, sleeve 3, and tubular arm 6 upwardly. To tilt the rim engaging mechanism 9 from a vertical position shown in Fig. 1 to a horizontal position shown in Fig. 2, the cam rod 30 is placed in a position indicated in Fig. 4, and the hand wheel 7 is turned a desired extent.

To lower rim-engaging mechanism 9, valve 47 is set in a position to permit exhaust to atmosphere of air therethrough from the cylinder 34, whereupon the tubular arm 6, sleeve 3, push rod 40 and piston 38 are lowered under the action of gravity. However, should it be desirable, under any circumstance, to insure positioning of the arm 6 and rim equipped tire assembly A in an elevated position, I provide a conventional globe valve 53, which may be opened and shut at will.

To release the tire rim engaging mechanism 9 from rim equipped tire assembly A, the valve 51 is placed in a position to permit escape through line 50 of air under pressure from cylinder 16 whereupon the removable dog 22 will be retracted under the action of spring 24.

While I have disclosed a preferred embodiment of my invention as provided by Sec. 4888 of the U. S. Statutes, it should be understood that the same is subject to modification without departing from the scope of the appended claim.

What I claim is:

A rotatably and pivotally adjustable wheel hoist and support including a base, an upright supporting member rigidly secured at its lower end to said base, a split sleeve pivotally connected to the upper end of said upright, a forwardly-projecting arm journalled adjacent its rear end in said split sleeve, means for contracting said sleeve about said arm whereby to lock said arm in a desired set position, a hand wheel secured to the extreme rear end of said arm, a lateral offset in said arm intermediate said sleeve and the forward end thereof, tire rim engaging means on the forward end of said arm in substantial alignment with the axis of rotation of said arm, and means for raising and lowering the forward end of said arm.

CHARLES E. BRANICK.

REFERENCES CITED

The following references are of record in the file of this patent:

UNITED STATES PATENTS

| Number | Name | Date |
| --- | --- | --- |
| 1,321,983 | Cole | Nov. 18, 1919 |
| 1,788,097 | Frisbie | Jan. 6, 1931 |
| 2,201,982 | Bazarek | May 28, 1940 |
| 2,213,535 | Seip | Sept. 3, 1940 |
| 2,448,414 | Branick | Aug. 31, 1948 |

FOREIGN PATENTS

| Number | Country | Date |
| --- | --- | --- |
| 396,071 | France | Jan. 15, 1909 |